(12) United States Patent
Inaba et al.

(10) Patent No.: US 6,466,327 B2
(45) Date of Patent: *Oct. 15, 2002

(54) IMAGE FORMING SYSTEM THAT RENEWS STARTING TIMES OF INTERRUPTED JOBS

(75) Inventors: Keishi Inaba, Yokohama; Hiroshi Ozaki, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,372

(22) Filed: Jan. 12, 1998

(65) Prior Publication Data

US 2002/0067495 A1 Jun. 6, 2002

Related U.S. Application Data

(63) Continuation of application No. 08/425,473, filed on Apr. 20, 1995.

(30) Foreign Application Priority Data

Apr. 20, 1994 (JP) .............................................. 6-081994

(51) Int. Cl.⁷ .............................................. G06K 15/00
(52) U.S. Cl. ...................................... 358/1.13; 358/1.14
(58) Field of Search ........................... 358/1.1, 1.2, 1.9, 358/1.12, 1.13, 1.14, 1.15, 1.16, 1.17, 400, 401, 407, 408, 443, 448; 714/2; 712/229, 23; 713/300, 323; 704/200, 201, 207

(56) References Cited

U.S. PATENT DOCUMENTS

| | | | |
|---|---|---|---|
| 4,882,630 A | | 11/1989 | Yamaguchi et al. ......... 358/451 |
| 4,947,345 A | | 8/1990 | Paradise et al. ............. 358/442 |
| 5,021,892 A | | 6/1991 | Kita et al. ................... 358/468 |
| 5,280,615 A | | 1/1994 | Church et al. ............... 709/104 |
| 5,287,434 A | | 2/1994 | Bain et al. ................... 358/1.16 |
| 5,327,526 A | * | 7/1994 | Nomura et al. .............. 395/115 |
| 5,377,016 A | | 12/1994 | Kashiwagi et al. .......... 358/448 |
| 5,428,458 A | | 6/1995 | Aiba et al. ................... 358/434 |
| 5,442,732 A | | 8/1995 | Matyseu et al. ............. 358/11.5 |
| 5,465,354 A | | 11/1995 | Hirosawa et al. ............ 358/106 |
| 5,467,434 A | * | 11/1995 | Hower, Jr. et al. .......... 395/114 |
| 5,535,009 A | * | 7/1996 | Hansen ......................... 358/296 |
| 5,537,643 A | | 7/1996 | Inoo et al. ................... 713/200 |
| 5,774,356 A | * | 6/1998 | Hisatane et al. ............. 364/148 |

* cited by examiner

*Primary Examiner*—Gabriel Garcia
(74) *Attorney, Agent, or Firm*—Fitzpatrick, Cella, Harper & Scinto

(57) ABSTRACT

An image forming system to which an external apparatus is connected and which accepts a plurality of jobs includes a display device for displaying information relating to the plurality of jobs, a device for changing a form of execution of the plurality of jobs displayed on the display device, and a device for changing a form of display of the information relating to the plurality of jobs so as to be able to identify the change in the execution form.

44 Claims, 15 Drawing Sheets

| No. | SERIAL No. | REQUESTER | PAGE | START TIME |
|---|---|---|---|---|
| 1 | 1869 | #1 | 20 | 10:31 |
| 2 | 1870 | #1 | 10 | 10:36 |
| 3 | 1871 | #2 | 16 | 10:39 |
| 4 | 1872 | #1 | 10 | 10:40 |

IN EXECUTION   COPY          CURRENT TIME   10:27

FIG. 10

| No. | SERIAL No. | REQUESTER | PAGE | START TIME |
|---|---|---|---|---|
| 1 | 1869 | #1 | 20 | 10:31 |
| 2 | 1870 | #1 | 10 | 10:36 |
| 3 | 1871 | #2 | — | |
| 4 | 1872 | #1 | | |

CANCEL    OK
CHANGE    UP
          DOWN

IN EXECUTION   COPY          CURRENT TIME   10:28

FIG. 11

| No. | SERIAL No. | REQUESTER | PAGE | START TIME |
|---|---|---|---|---|
| 1 | 1869 | #1 | 20 | 10:31 |
| 2 | 1870 | #1 | 10 | 10:36 |
|  | 1871 |  | CANCEL |  |
| 3 | 1872 | #1 | 10 | 10:39 |
| IN EXECUTION | FAX |  | CURRENT TIME | 10:30 |

FIG. 12A

| No. | SERIAL No. | REQUESTER | PAGE | START TIME |
|---|---|---|---|---|
| 1 | 1869 | #1 | 20 | 10:31 |
| 2 | 1871 | #2 | 16 | 10:36 |
| 3 | 1870 | #1 |  |  |
| 4 | 1872 | #1 |  |  |

| CANCEL | OK |
|---|---|
| CHANGE | UP |
|  | DOWN |

| IN EXECUTION | FAX | | CURRENT TIME | 10:29 |
|---|---|---|---|---|

FIG. 12B

| No. | SERIAL No. | KIND OF JOB | NUMBER OF PAGES | SIZE | DUPLEX | AMOUNT OF DATA | TIME OF RECEPTION | DURATION | EXECUTION FLAG |
|---|---|---|---|---|---|---|---|---|---|
| * | — | COPY | 10 | A3 | 0 | — | — | 00:01:30 | |
| * | — | FAX(R) | 5 | A4 | 0 | — | — | 00:04:20 | |
| 1 | 1869 | #1 | 20 | A4 | 1 | 8KB | 10:22:38 | 00:07:10 | 1 |
| 2 | 1870 | #1 | 10 | LT | 0 | 3KB | 10:24:15 | 00:03:20 | 1 |
| 3 | 1871 | #2 | 16 | LG | 1 | 6KB | 10:25:20 | 00:00:40 | 1 |
| 4 | 1872 | #1 | 10 | A4 | 1 | 3KB | 10:26:30 | 00:00:50 | 1 |
| 5 | | | | | | | | | |

FIG. 13B

IMAGE FORMING SYSTEM THAT RENEWS STARTING TIMES OF INTERRUPTED JOBS

This application is a continuation of application Ser. No. 08/425,473, filed Apr. 20, 1995.

BACKGROUND OF THE INVENTION

1. Field of the Invention

This invention relates to an image forming system capable of receiving a plurality of jobs.

2. Description of the Related Art

In conventional image forming apparatuses capable of receiving a plurality of jobs, priority of processing is given to a job which has been received earlier by the apparatus. That is, in the conventional image forming apparatuses, jobs are processed in the order of reception.

However, in the conventional image forming apparatuses, since jobs are processed in the order of reception and the order of execution of processing cannot be changed, job processing lacks in flexibility, and therefore effective processing cannot be performed.

Although a method for solving the above-described problems has been proposed in U.S. Pat. No. 5,327,526, this method is not sufficient for solving the problems.

SUMMARY OF THE INVENTION

The present invention has been made in consideration of the above-described problems.

It is an object of the present invention to provide an image forming system capable of effectively processing requested jobs and reducing the time required for processing the jobs.

According to one aspect, the present invention, which achieves the above-described object, relates to an image forming system to which an external apparatus is connected and which accepts a plurality of jobs, comprising display means for displaying information relating to the plurality of jobs, means for changing a form execution of the plurality of jobs displayed on the display means, and means for changing a form of display of the information relating to the plurality of jobs so as to be able to identify the change in the execution form.

According to this configuration, effective job control and job processing can be performed.

Furthermore, according to this configuration, setting of job processing is simplified.

It is another object of the present invention to facilitate job control in a multi-function image forming apparatus having at least one function of a copier, a facsimile apparatus, a filing apparatus and the like as well as a printer receivable a plurality of jobs from external apparatuses.

The foregoing and other objects, advantages and features of the present invention will become more apparent from the following detailed description of the preferred embodiment taken in conjunction with the accompanying drawings.

BRIEF DESCRIPTION OF THE DRAWINGS

FIG. 10 is a diagram illustrating an example of display of information relating to jobs accepted at the present time by an external computer;

FIGS. 11, 12A and 12B are diagrams illustrating a change in the order of execution of jobs instructed from the external computer and cancel of a job instructed from the external computer;

FIG. 13B is a diagram illustrating the job table shown in FIG. 13A;

DETAILED DESCRIPTION OF THE PREFERRED EMBODIMENT

A preferred embodiment of the present invention will now be described in detail with reference to the drawings.

Figure 1:
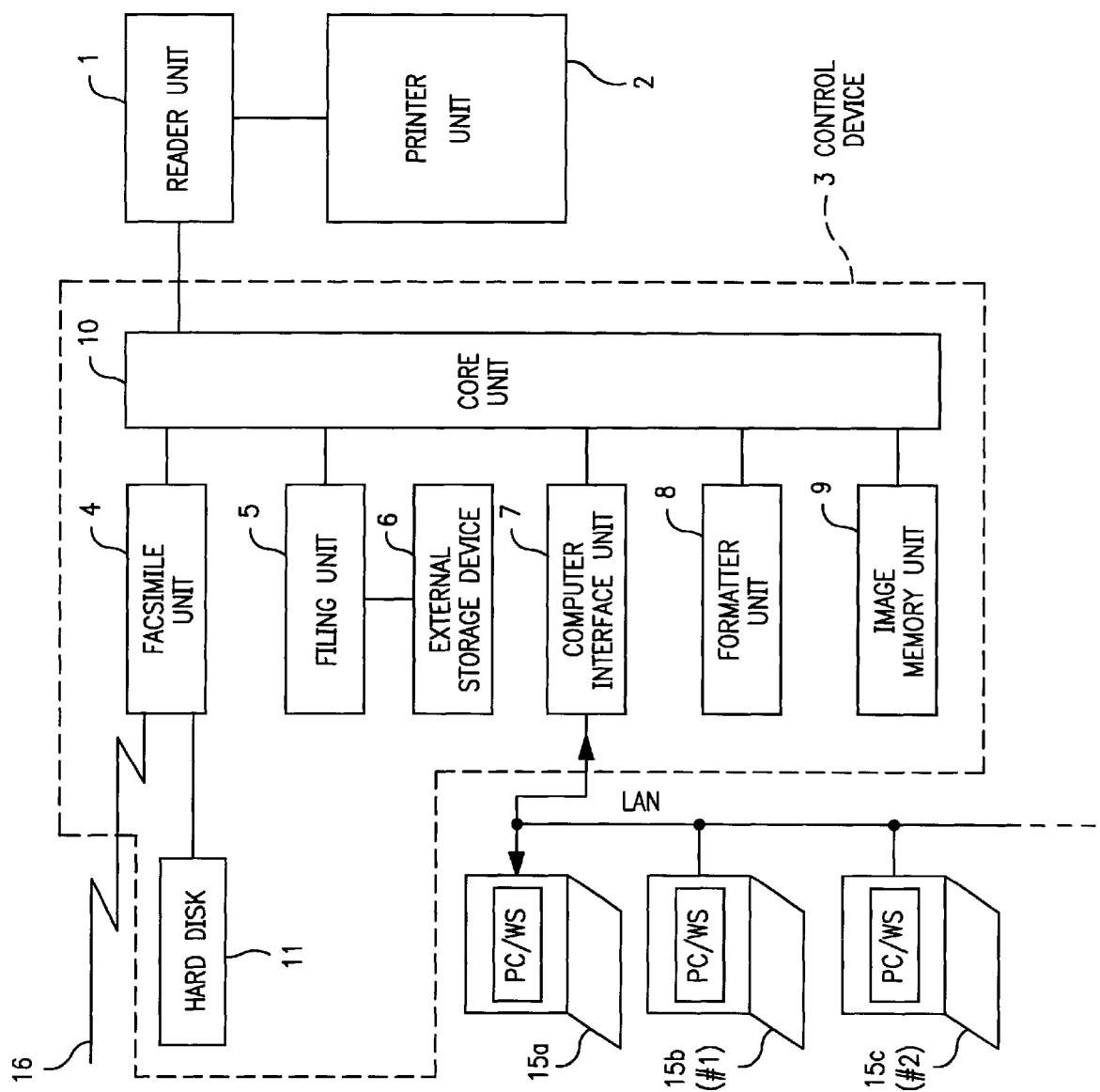
FIG. 1 is a block diagram illustrating the configuration of an image forming system according to an embodiment of the present invention.

FIG. 1 is a block diagram illustrating the configuration of an image forming system according to the embodiment. In FIG. 1, an image input device (hereinafter termed a "reader unit") 1 converts an image of an original (not shown) into image data. An image output device (hereinafter termed a "printer unit") 2 includes a plurality of kinds of recording-paper cassettes, and outputs the image data onto recording paper in the form of a visual image in response to an input printing command. A control device 3 is electrically connected to the reader unit 1, and has the following functions.

The control device 3 includes a facsimile unit 4, a filing unit 5, an external storage device 6 connected to the filing unit 5, a computer interface unit 7 for connecting the device 3 to computers 15a through 15c via a LAN (local area network), a formatter unit 8 for converting information from the computers 15a through 15c into bit-map data, an image memory unit 9 for storing information from the reader unit 1 and temporarily storing information transmitted from the computers 15a through 15c, and a core unit 10 for controlling these functional units. A hard disk 11 for storing facsimile information, and a telephone line 16 for communication are connected to the facsimile unit 4. As will be described later, the computer 15a functions as a server.

Figure 2:
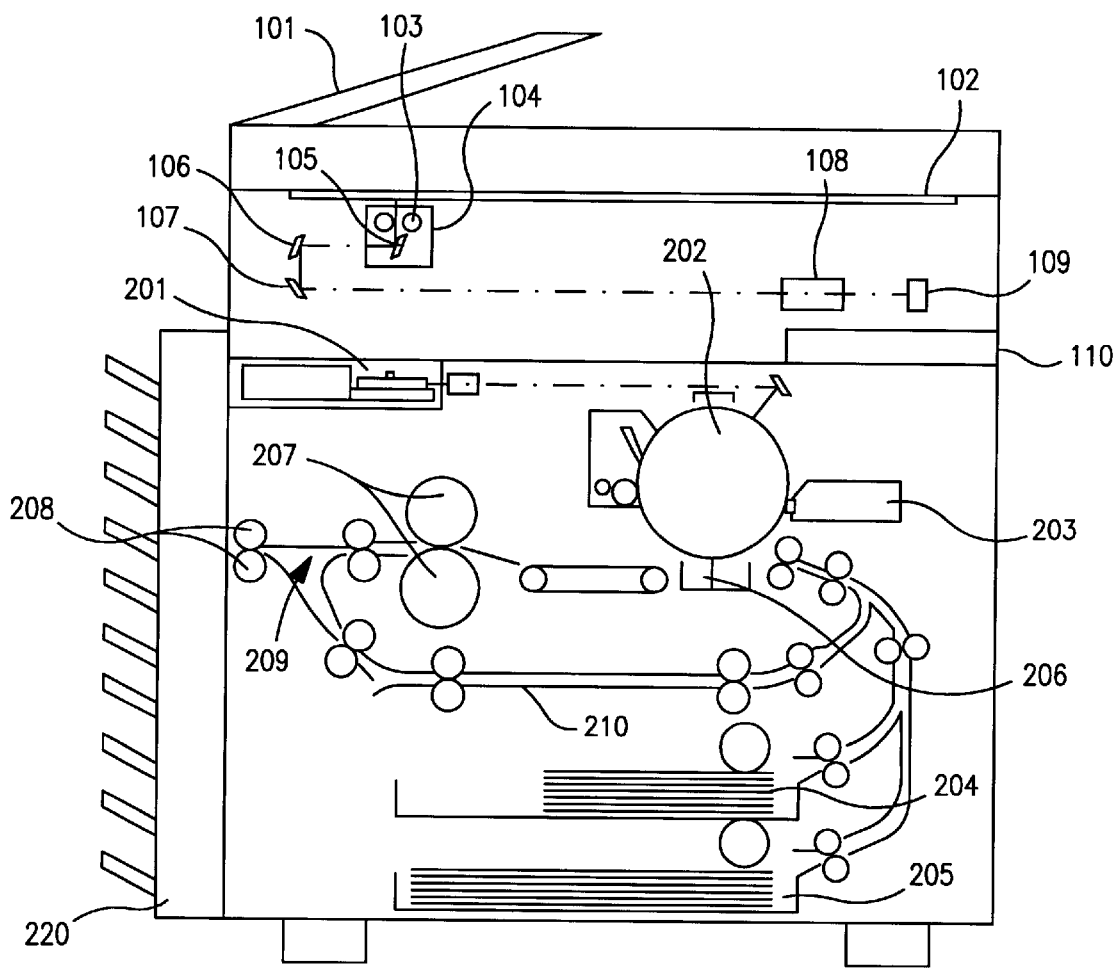
FIG. 2 is a cross-sectional view illustrating a reader unit and a printer unit shown in FIG. 1.

FIG. 2 is a cross-sectional view illustrating the internal configuration of the reader unit 1 and the printer unit 2 constituting the image forming system of the present embodiment.

A description will now be provided of the configuration and the operation of the reader unit 1 and the printer unit 2 of the present embodiment with reference to FIG. 2. In FIG. 2, originals (not shown) mounted on an original-feeding device 101 are individually and sequentially fed onto an original-mount glass surface 102. When an original has been fed to a predetermined position on the original-mount glass surface 102, a lamp 103 of a scanner unit 104 is lit, and the scanner unit 104 moves to project light onto the original. Reflected light from the original is input to a CCD (charge-coupled device) image sensor unit (hereinafter abbreviated as a "CCD") 109 via mirrors 105, 106 and 107, and a lens 108.

The reflected light from the original input to the CCD 109 is subjected to photoelectric conversion, and an electrical signal obtained by the conversion is subjected to various kinds of image processing by an image processing unit 110, and then reaches an external switching circuit (not shown).

The external switching circuit is a selector for switching a signal from the reader unit 1 to the printer unit 2 or the control device 3. The external switching circuit also has the function of selecting one of a signal from the reader unit 1 and a signal from the control device 3, and connects the selected signal to the printer unit 2.

The electrical signal connected to the printer unit 2 by the external switching circuit of the image processing unit 110 is converted into an optical signal modulated by an exposure control unit 201, and the optical signal illuminates a photosensitive member 202. A latent image formed on the photosensitive member 202 by the optical signal is developed by a developing unit 203. Transfer paper is fed from a transfer-paper mounting unit 204 (or a transfer-paper mounting unit 205) while adjusting the timing with the leading edge of the developed image, and the developed image is transferred onto the transfer paper by a transfer unit 206.

The transferred image is fixed on the transfer paper by a fixing unit 207, and is discharged outside the apparatus by a sheet-discharging unit 208. The transfer paper fed by the sheet-discharging unit 208 is discharged onto a corresponding bin of a sector 220 when the sorting function of the sorter 220 operates, and onto the uppermost bin of the sorter 220 when the sorting function of the sorter 220 does not operate.

When outputting sequentially read images onto two surfaces of a single sheet of output paper, the sheet on which an image has been fixed by the fixing unit 207 is first fed to the sheet-discharging unit 208. Then, the feeding direction of the sheet is inverted, and the sheet is fed to a unit 210 for mounting transfer paper to be refed via a feeding-direction switching member 209. When the next original has been prepared, the image of the original is read in the above-described manner. In this case, since the transfer paper is fed from the unit 210 for mounting transfers paper to be refed, the images of the two originals can be output on the both surfaces of the same transfer paper.

Figure 3:
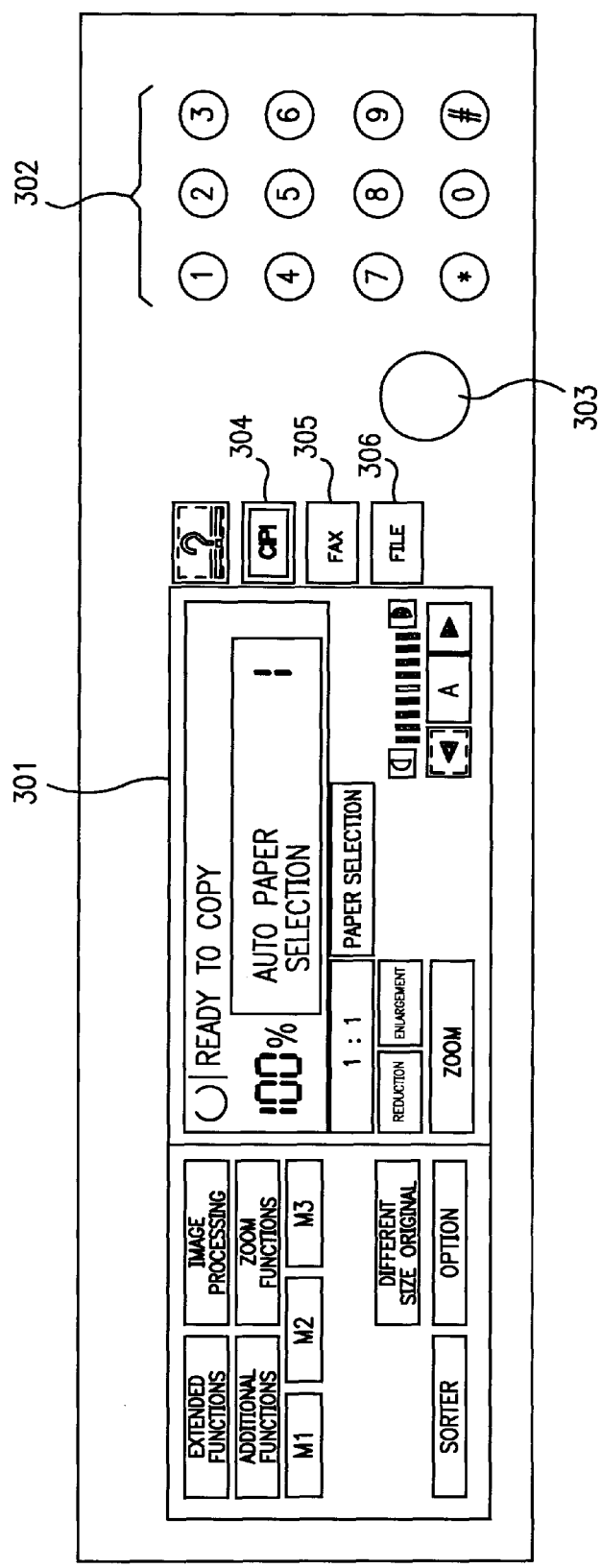
FIG. 3 is a diagram illustrating the configuration of an operational panel of the reader unit.

FIG. 3 is a diagram illustrating the configuration of an operation panel provided on the reader unit 1. In FIG. 3, an operational state of the image forming system and various kinds of messages are displayed on a display unit 301. The display unit 301 operates as a tough panel. When the operator touches a predetermined position on the surface of the display unit 301, the display unit 301 functions as a selection key. Ten keys 302 are used for inputting a desired numeral. By depressing a start key 303, the reader unit 1 and the like start to operate. Reference numerals 304 through 306 represent keys for selecting a copying mode, a facsimile transmission mode and a filling mode, respectively.

Next, the operation of the image forming system of the present embodiment will be described in detail with reference to the flowcharts shown in FIGS. 4 through 9.

Figure 4:
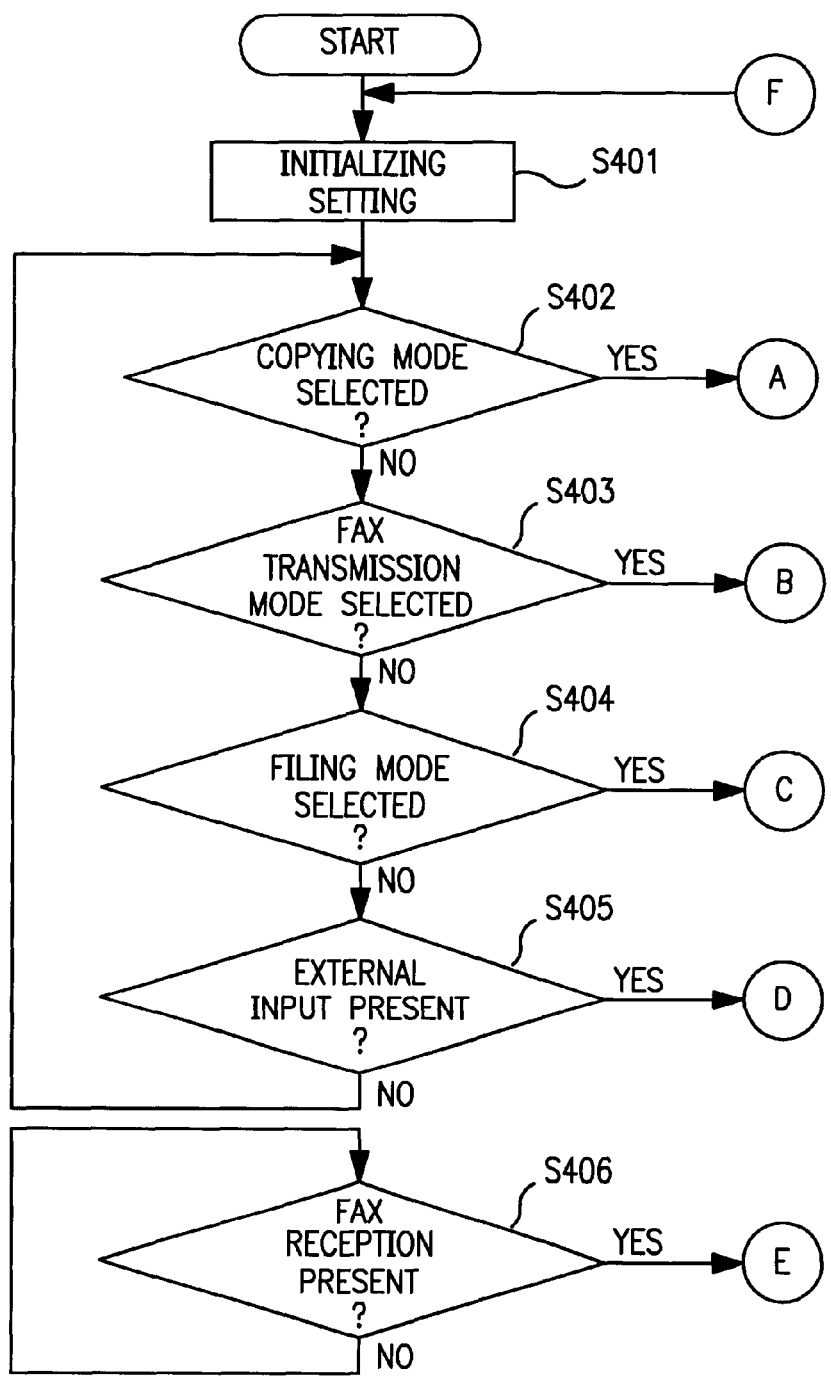
FIG. 4 is a flowchart illustrating the operation of the apparatus.

First, in step S401 of the flowchart shown in FIG. 4, predetermined initializing setting is performed after turning on the power supply of the system. The operational-mode selection keys 304–305 are displayed on the display unit 301 of the operation panel, and a desired mode is selected by the operator by touching the position of the selection key corresponding to the mode.

That is, in step S402, it is determined if the selected mode is the copying mode. If the result of the determination is affirmative, the process proceeds to the processing step shown in FIG. 5. If the result of the determination is negative, the process proceeds to step S403, where it is determined if the selected mode is the facsimile transmission mode. If the result of the determination is affirmative, the process proceeds to the processing step shown in FIG. 6.

If the result of the determination in step S403 is negative, the process proceeds to step S404, where it is determined if the selected mode is the filing mode. If the result of the determination is affirmative, the process proceeds to the processing step shown in FIG. 7.

If the result of the determination in step S404 is negative, the process proceeds to step S405, where it is determined if an external input is present, i.e., if input of a job from the computer interface unit 7 is present. If the result of the determination is affirmative, the process proceeds to the processing step shown in FIG. 8. If the result of the determination in step S405 is negative, the process returns to step S402, and the above-described determination of the selected mode in steps S402–S405 is repeated. If facsimile reception is present (step S405), the process proceeds to the processing step shown in FIG. 9.

Operation When the Copying Mode Has Been Selected

Figure 5:
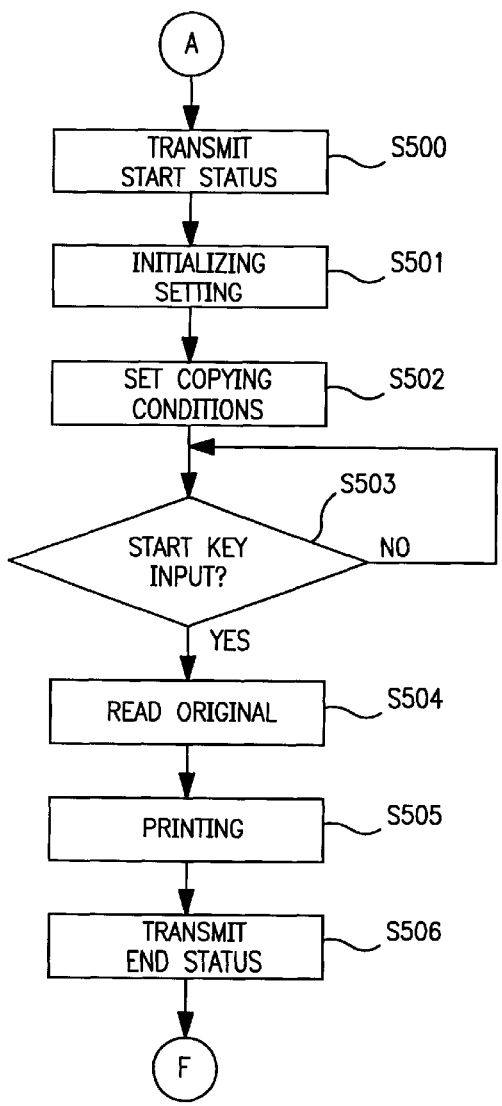
FIG. 5 is a flowchart illustrating a copying operation.

FIG. 5 is a flowchart illustrating processing procedures when the copying mode has been selected.

When the copying mode has been selected, a start status is transmitted to the computer 15a (step S500). Thereafter, initializing setting of a copying operation is performed (step S501). Then, copying conditions are set by reading data input through the keys 301 and 302 on the operation panel (step S502). Then, an input of the start key 303 is awaited (step S603).

Upon depression of the start key 303, the original is read by the reader unit 1 (step S504), and predetermined printing is performed by the printer unit 2 (step S505). In the present embodiment, when the start key 303 has been depressed, the status, comprising the number of pages, the size of paper, simplex or duplex copying, and the like, is transmitted to the computer 15a. The printing operation is performed according to the printing procedures described with reference to FIG. 2. After completing the printing operation, the status of the end of the copying mode is transmitted to the computer 15a (step S506), and the process returns to the state of initializing setting (step S401 shown in FIG. 4).

Operation When the Facsimile Transmission Mode Has Been Selected

Figure 6:
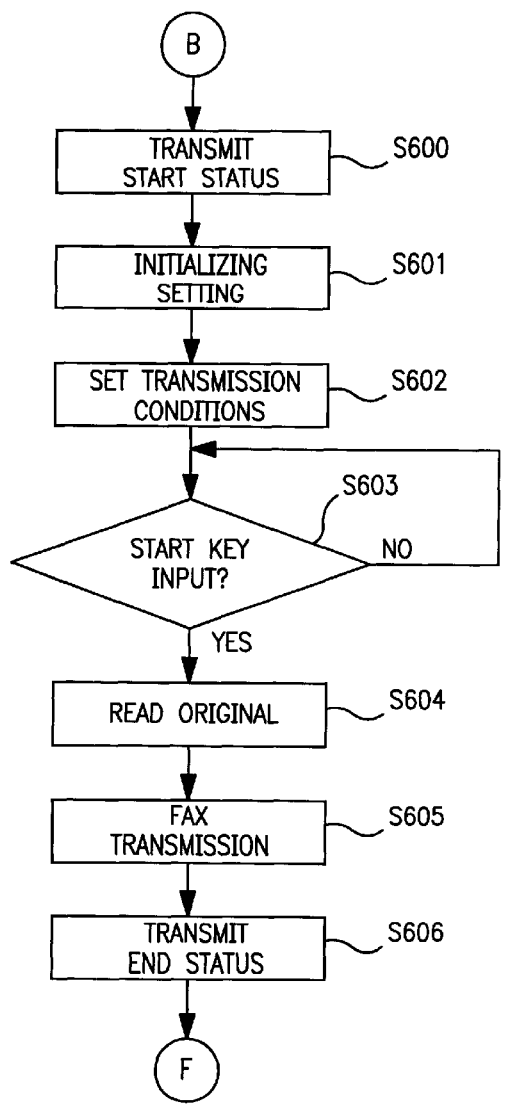
FIG. 6 is a flowchart illustrating a facsimile transmission operation.

FIG. 6 is a flowchart illustrating the operation when the facsimile transmission mode has been selected. When the facsimile transmission mode has been selected, a start status is transmitted to the computer 15a (step S600). In step S601, initializing setting of facsimile transmission is performed. Thereafter, transmission conditions are set by reading the contents of the telephone number of the communication partner's facsimile apparatus, and the like (step S602). Then, an input of the start key 303 is awaited (step S603).

Upon depression of the start key 303, the reader unit 1 reads the original (step S504), and obtained image data is transmitted to the facsimile unit 4. The facsimile unit 4 performs facsimile transmission according to the set mode and a determined protocol (step S605). After completing transmission, the status of the end of the facsimile transmission is transmitted to the computer 15a (step S606), and the process returns to the state of initializing setting (step S401) shown in FIG. 4).

Operation When the Filing Mode Has Been Selected

Figure 7:
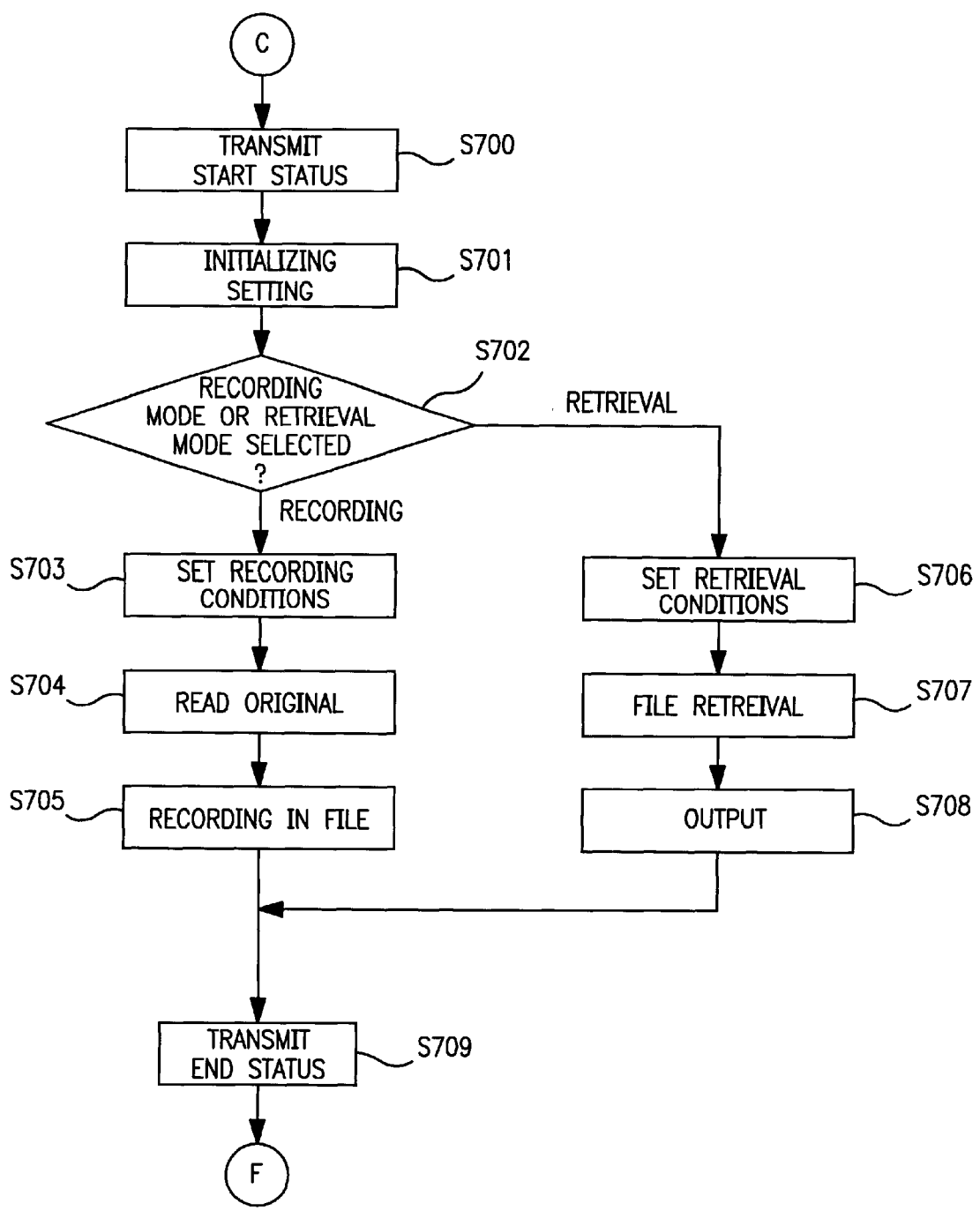
FIG. 7 is a flowchart illustrating the operation when performing file recording/retrieval.

FIG. 7 is a flowchart illustrating the operation when the filing mode has been selected.

When the filing mode has been selected, a filing-mode start status is transmitted to the computer 16a (step S700). Thereafter, initializing setting of a filing operation is performed (step S701). Then, a file recording key and a file retrieval key (not shown) are displayed on the operation panel, and a key input is awaited (step S702). When the recording key has been selected in step S702, recording conditions are set (step S703), and then the reader unit 1 reads the original (step S704). Thereafter, data is transmitted to the filing unit 5, which records the data in the external storage device 6 (step S706).

When the file retrieval key has been selected in step S702, retrieval conditions are set (step S706), and file retrieval by the external storage device 5 is performed (step S707). In step S708, the result of the retrieval is output. After completing the recording or the retrieval, a filing-mode end status is transmitted to the computer 15a (step S709), and the process returns to initializing setting (step S401 shown in FIG. 4).

Operation When an External Mode Has Been Selected

Figure 8:
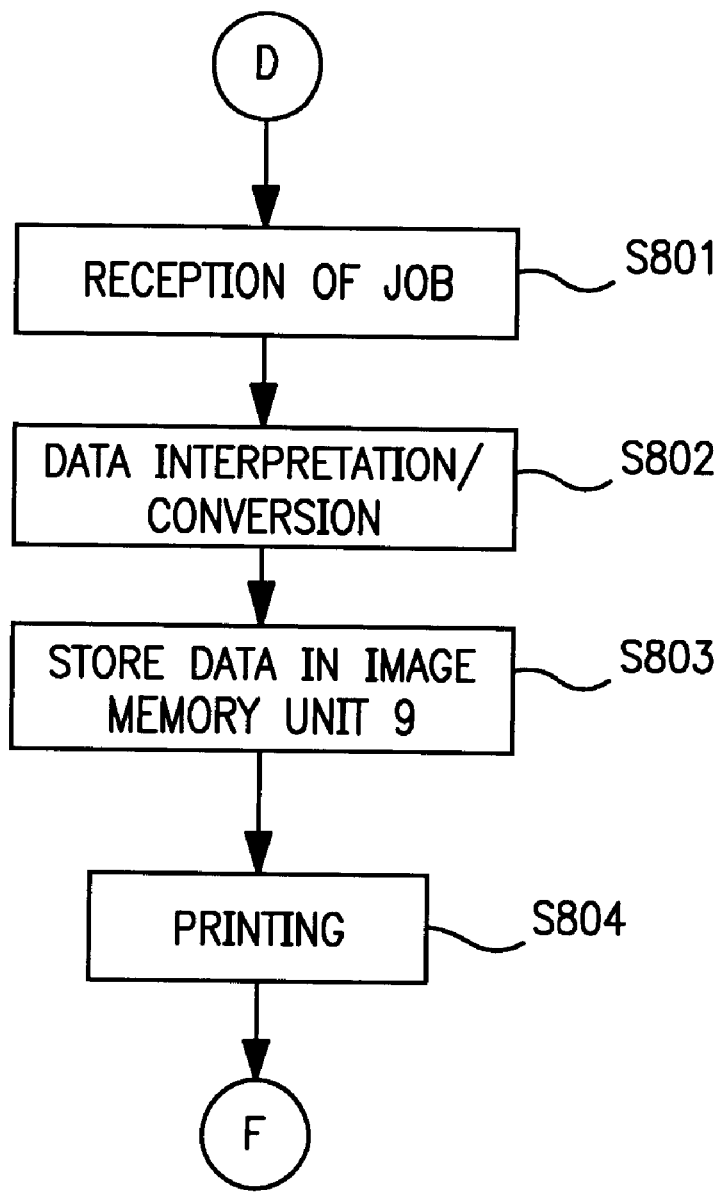
FIG. 8 is a flowchart illustrating the operation when performing printing from an external interface.
Figure 9:
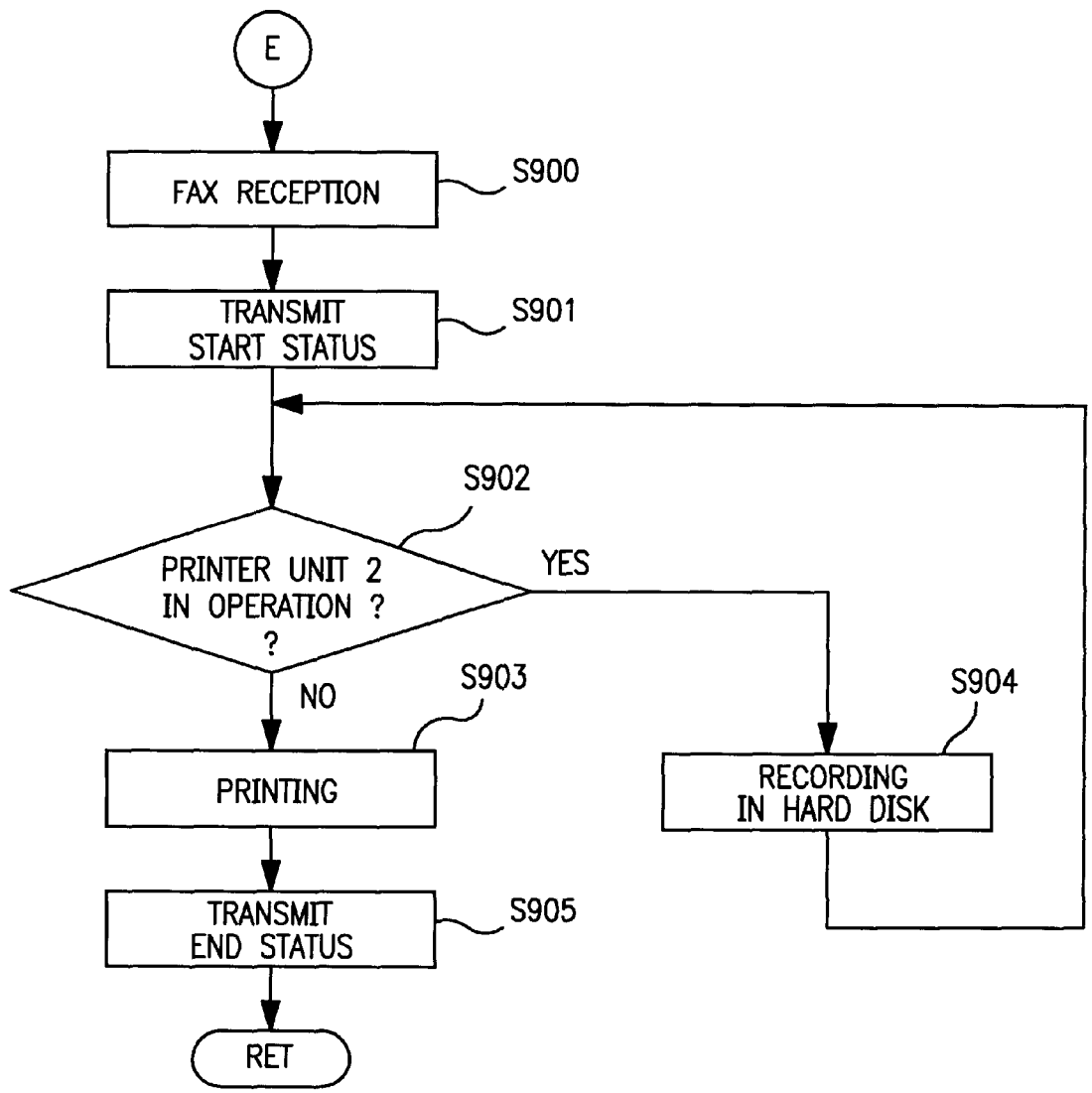
FIG. 9 is a flowchart illustrating the operation in facsimile reception.

FIG. 8 is a flowchart illustrating the operation when command data has been input from the computer 15a via the computer interface unit 7.

In this mode, first, a job (described in Page Description Language) including commands and the like is received by the computer interface unit 7 (step S801). The received data is transmitted to the formatter unit 8 via the core unit 10. The formatter unit 8 converts the data into pixel information (bit-map data) by interpreting the contents of the data, and stores the data in the image memory unit 9 (steps S802 and S803). Thereafter, the pixel information is transmitted from the image memory unit 9 to the printer unit 2, which performs printing (step S804).

When printing a plurality of pages, the steps S802–S804 are executed sequentially. After completing the entire printing operation, the process returns to initializing setting (step S401 shown in FIG. 4).

Facsimile Reception Operation

The operations of a plurality of modes from among the above-described operations are not executed simultaneously. However, the operation of the facsimile reception mode (step S406 shown in FIG. 4), which will be described below, is started even if the operation of another mode is being executed.

When facsimile reception has been performed by the facsimile unit 4 (step S900), a start status is transmitted to the computer 15a (step S901). Thereafter, it is determined if the printer unit 2 is operating (if another job is being executed) (step S902). If the result of the determination is negative, received data is transmitted to the printer unit 2, which performs predetermined printing processing (step S903). Upon completion of the printing processing, an end status is transmitted to the computer 15a (step S905).

If the result of the determination in step S902 is affirmative, received data is stored in the hard disk 11 connected to the facsimile unit 4 (step S904). Upon completion of the operation of the printer unit 2 (upon completion of the job having been executed), printing of the data is performed (step S903). In the present embodiment, when data for one communication operation has been stored in the hard disk 11, the status, comprising the number of pages, the size of paper, and simplex or duplex printing, is transmitted to the computer 15a. Upon completion of the printing operation, an end status is transmitted to the computer 15a (step S905), and the process returns to initializing setting (step S401 shown in FIG. 4).

Next, a description will be provided of the configuration of the external computer 15a.

Figure 13A:
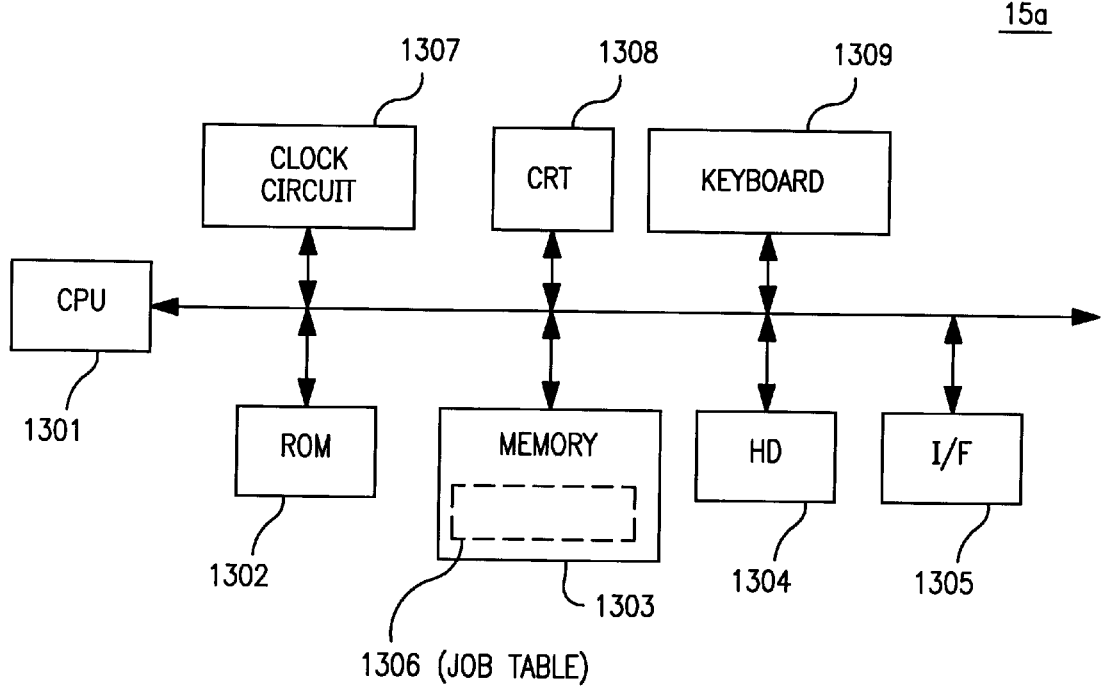
FIG. 13A is a diagram illustrating the configuration of the external computer.

As shown in FIG. 13A, a CPU 1301 performs processing by reading a program stored in a ROM (read-only memory) 1302 or a HD (hard disk) 1304. Data, such as the result of the processing, and the like, can be stored in a memory 1303, whose capacity can be increased by extension. The memory 1303 includes a job table 1306 (to be described later), which stores data, such as the kind of each job, the serial number, the number of pages, the time of reception of each job, duration required for executing each job, and the like.

A clock circuit 1307 provides the time of reception of each job, and the estimated start time of each job. A CRT (cathode-ray tube) 1308 displays information relating to the accepted jobs. A keyboard 1309 is used for performing an operation, such as change or cancel of a job, or the like. An I/F (interface) 1306 is used for performing transmission/reception of data with the other computers 15b and 15c, and the control device 3 shown in FIG. 1 via the above-described LAN.

The operation of the computer 15a having the above-described configuration will now be described.

(1) Reception of a job

Figures 14A, 14B:
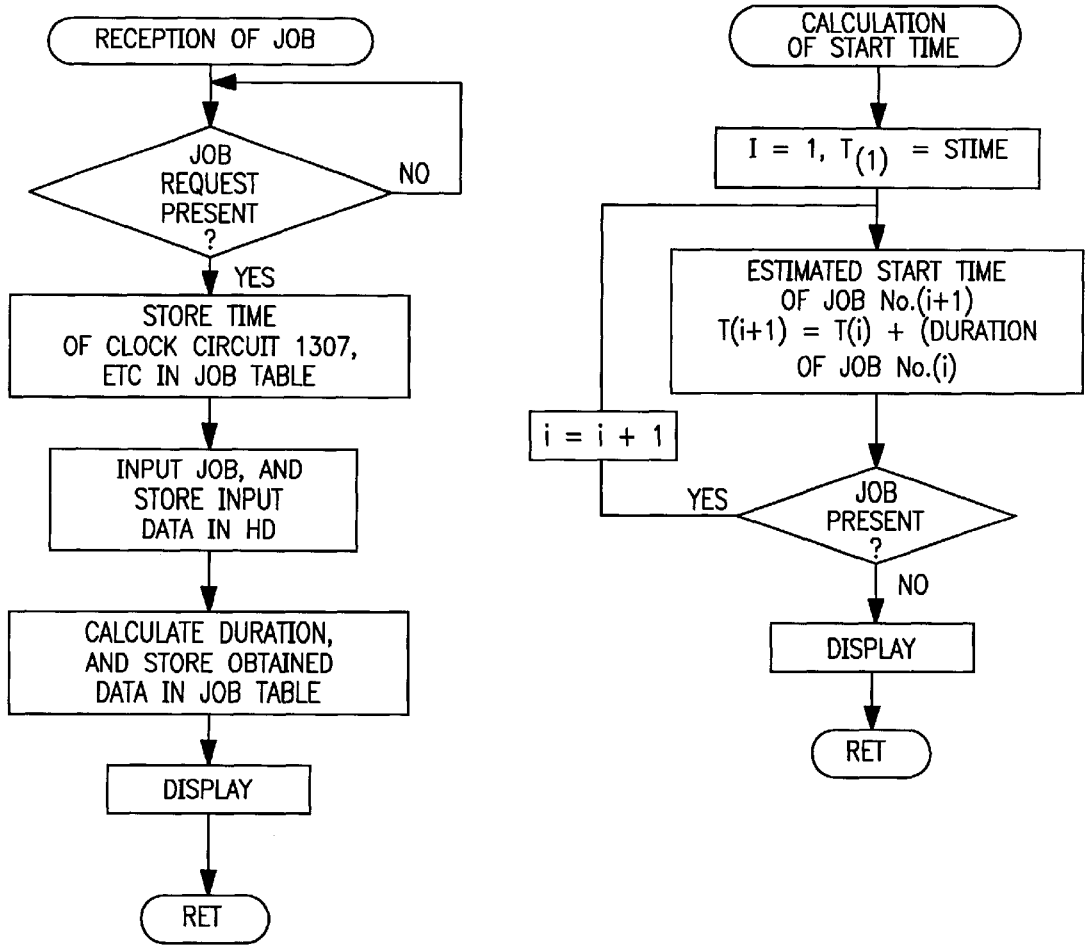
FIG. 14A is a flowchart illustrating a job reception operation.
FIG. 14B is a flowchart illustrating the operation of calculating the start time of a job.

FIG. 14A is a flowchart illustrating a job reception operation of the computer 15a.

When there has been a request of a job from another computer, the computer 15a stores the serial number ("1873" in the case of FIG. 13B), the identification code (#1 or #2 ) of the computer in communication, and the time of the clock circuit 1307 as the time of reception in the column of the next number ("5" in the case of FIG. 13B) of the job table. A leading portion of job data includes data relating to duration required for executing the job, such as the number of pages to be printed, the size of paper, duplex or simplex printing, the amount of data, and the like. Such data are also described in U.S. Pat. No. 5,327,626 (FIG. 2). The computer 15a stores such data in the job table, and also stores input data in the HD 1304. Thereafter, duration required for executing the job is calculated from the contents of the job table.

Usually, such duration is obtained by adding the communication time period of job data from the computer 15a to the control device 3 (substantially proportional to the above-described amount of data), the time period required for conversion into pixel information by the formatter unit 8 (Strictly speaking, this value may, for example, be calculated by a method described in U.S. Pat. No. 5,274,461. In the present embodiment, however, this value is obtained from the above-described amount of data), and the printing time period by the printer unit 2 (calculated from the above-described number of pages to be printed, the size of paper, and duplex or simplex printing).

The computer 15a stores the obtained duration in the job table, and terminates the job reception operation. The contents of the job table are displayed on the CRT 1308. FIG. 10 illustrates an example of display on the CRT 1308.

(2) Calculation of the start time of a job

FIG. 14B is a flowchart illustrating processing of calculation of the start time of a job by the computer 16a.

The start time STIME of the job to be subsequently executed (the job No. 1 in the job table) has been calculated by the operation shown in FIG. 14C (to be described later). Hence, the estimated start time T(2) of the job No. 2 is obtained as:

T(2)=T(1) (=STIME)+(duration of the job No. 1).
Similarly, the estimated start time T(1) of the job No. 1 is obtained as:
T(i)=T(i−1)+(duration of the job No. (i−1)) (i=2, 3, . . . ).

When the start times of all received jobs have been obtained, they are displayed on the CRT 1308 (see FIG. 10), and the processing is terminated.

(3) Processing after a status input

Figure 14C:
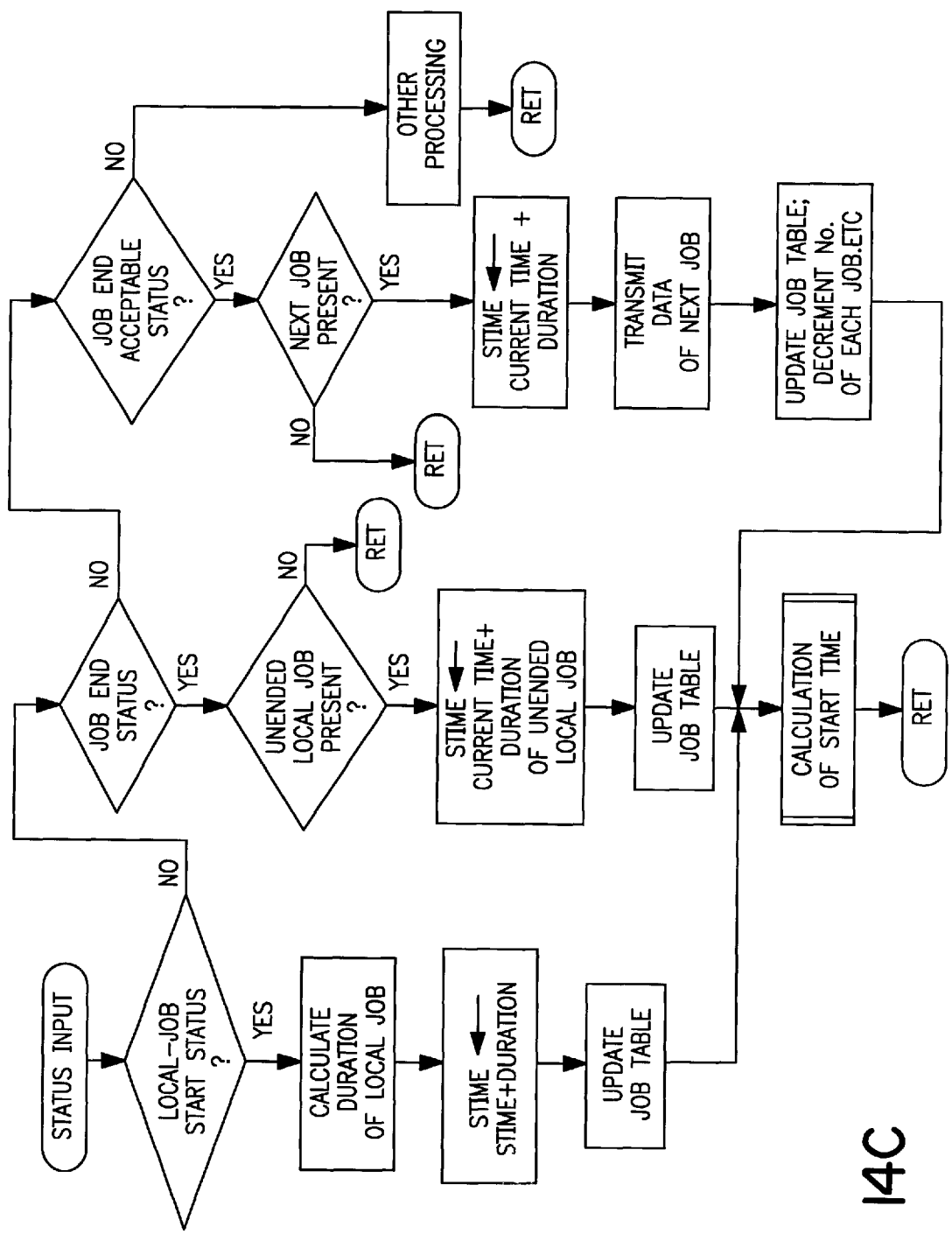
FIG. 14C is a flowchart illustrating processing after a status input.

FIG. 14C is a flowchart illustrating processing after a status input from the control device 3 performed in the computer 15a.

As described above, the apparatus shown in FIG. 2 executes processing, such as copying, facsimile transmission, processing relating to filing, printing of the contents of received facsimile communication, and the like, in addition to jobs received by the computer 15a. These processes are termed "local jobs" in order to discriminate from jobs received by the computer 15a.

When the status input from the control device 3 is a start status of a local job, the time period required for executing the local job is calculated. As described above, when performing a local job, such as copying, facsimile reception or the like, information relating to the number of pages to be printed, the size of paper, duplex or simplex printing, and the like is transmitted from the control device 3. Hence, duration of the local job is calculated based on the information. Received data and data relating to the calculated duration and the like are stored in the job table. Data having a mark "*" in the column of No. in the job table relates to such a local job. The calculated duration is added to STIME, and the above-described start-time calculation routine is executed.

When duration of the local job relating to the transmitted start status cannot be calculated, the value of STIME is incremented with the lapse of time until processing of the local job is terminated.

When the status input from the control device 3 is a status indicating end of a job, it is determined if an unended local job is present. When a local job to be executed remains in the control device 3 when execution of one job has been terminated, i.e., for example, when facsimile communication has been received during execution of a local job (when the job table shown in FIG. 13B has been formed), the control device 3 executes the remaining local job before executing jobs received by the computer 15a. Usually, either local jobs then facsimile reception are not accepted while a job is executed. However, for example, interrupt by a local job may be allowed while a job is executed. In such a case, a start status and an end status of the interrupting local job are transmitted as in the case of facsimile reception. Accordingly, printing of facsimile data stored in the HD or an interrupting local job (such a local job being started when a job being executed has been processed) becomes an unended local job.

The computer 15a reads the duration of the unended local job (the sum of durations of respective local jobs when a plurality of local jobs are present) from the job table, adds the duration to the current time called from the clock circuit 1307, and stores the result of the addition as STIME. If data relating to an ended job is present in the job table, the data is cleared.

The operations after this operation are the same as in the above-described case of reception of a start status.

When the job has been executed and there is no local job to be executed, the control device 3 transmits a status indicating that a job is acceptable to the computer 15a. When data of the next job to be executed (the job No. 1) is stored in the HD, the computer 15a receives the current time from the clock circuit 1307, adds duration of the job No. 1 to the current time, and stores the result of the addition as STIME. The computer 15a then reads data of the job No. 1 from the HD, and transmits the job data to the control device 3 via the I/F 1305 and the like in order to start the job No. 1.

The computer 15a then clears data relating to the job No. 1 from the job table, and updates the job table by decrementing the number of each job. Since an error may have been produced in the estimated start time of each job, the computer 15a calculates the estimated start time of each job according to the above-described processing, the displays the updated job table on the CRT 1308.

(4) Change of the order of job execution/Cancel of a job

Figure 14D:
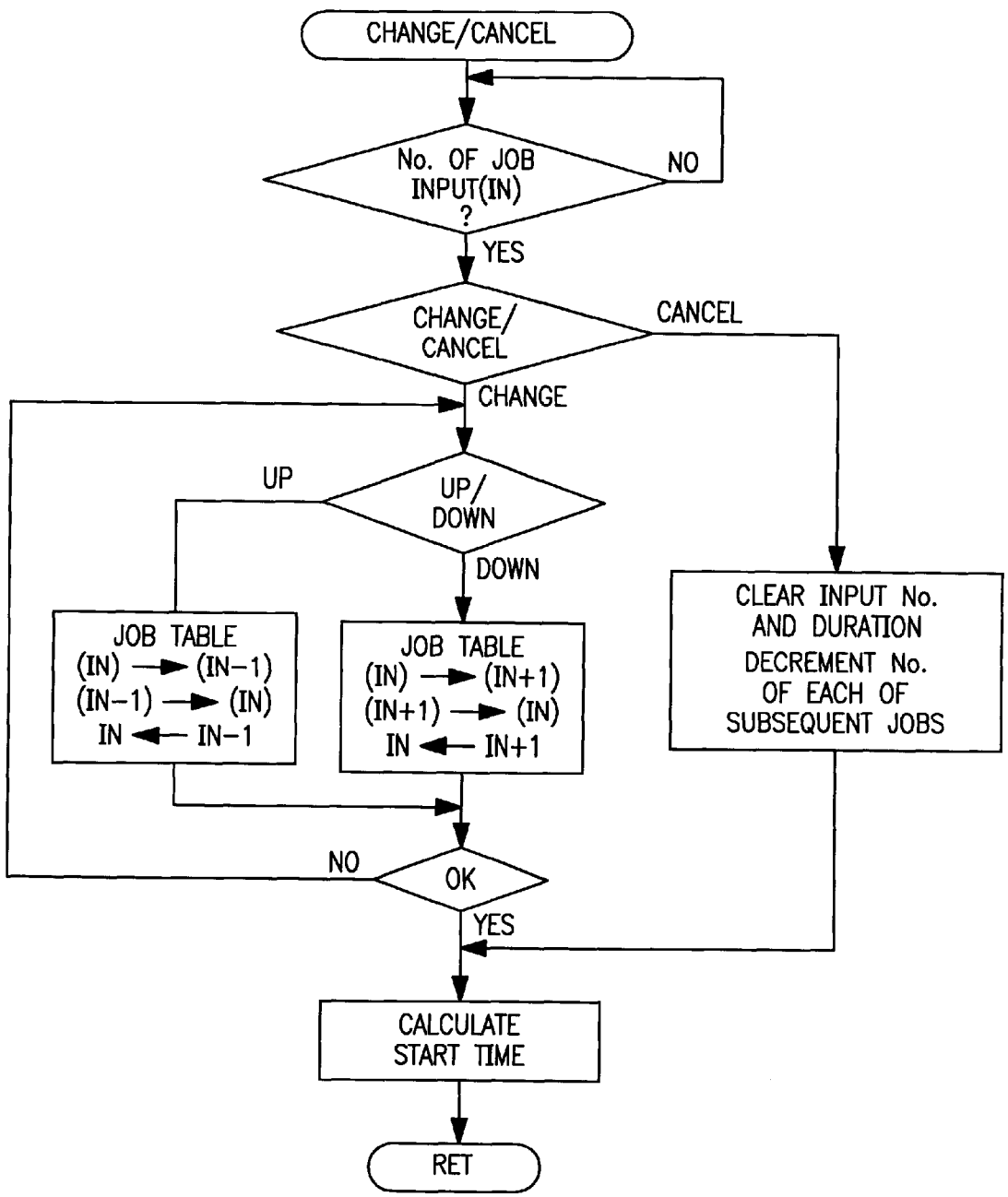
FIG. 14D is a flowchart illustrating processing of change of the order or execution of jobs and cancel of a job.

FIG. 14D is a flowchart illustrating processing of change of the order of job execution, and cancel of a received job.

When a job whose execution order is to be changed or whose execution is to be cancelled is present in the display shown in FIG. 10, the number of the job is input using a mouse or a keyboard. Thus, the window shown in FIG. 11 is displayed. By clicking "cancel" and "OK", the input number (IN, IN=3 in the case of FIG. 11) and duration of the job shown in the job table are cleared, and the number of each of the subsequent jobs is decremented. The execution flag in the job table is made to be "0" for the cancelled job. Then, the above-described start-time calculation routine is executed. FIG. 12A illustrates an example of display on the CRT 1308 after the cancel.

By clicking "change" and "up" in the display shown in FIG. 11, a row IN ("3" in this case) in the column "No" of the job table is changed to a row (IN−1) ("2" in this case), and a row (IN−1) ("2") is changed to row a IN ("3"), and the number of IN is decremented. At that time, the display is changed as shown in FIG. 12B. By clicking "OK" in this state, the window disappears. It is also possible to further click "up" or "down". If "down" is clicked in the state shown in FIG. 12B, the values in the column "No" of the job table are updated inversely to the case of clicking "up" to provide the display shown in FIG. 11.

A description has been provided of change of the execution order of received jobs, and cancel of execution of a job. In another approach, for example, it is possible to provide setting of executing a plurality of jobs at a time.

In a combined image forming apparatus having functions of a copier, a printer, a facsimile apparats, a filing apparatus and the like as in the present embodiment, by providing setting of combining respective jobs, a plurality of jobs may be processed at a time. For example, it is possible to provide setting of outputting a plurality of copies by combining a facsimile apparatus and a filing apparatus, and binding respective copies in a single job.

By outputting a plurality of copies by combining a facsimile apparatus and a filing unit, and binding respective copies, setting of bookbinding is performed. Setting of such processing may be performed in a single job.

The function of the computer 15a may be incorporated within the control device 3, or the function of the control device 3 may be incorporated within the apparatus shown in FIG. 2, or the functions of the computer 15a and the control device 3 may be incorporated within the apparatus shown in FIG. 2 within the spirit and scope of the present invention.

In the above-described embodiment, information relating to a plurality of jobs is displayed on the CRT 1308 of the computer 15a. However, for example, the information may also be displayed on the touch panel 301 shown in FIG. 3, and change of the execution order of jobs and cancel of execution of a job may be realized by operating the touch panel 301, or the information may be displayed on the CRT of one of the other computers 15b and 15c, and the above-described change and cancel may be performed within the spirit and scope of the present invention.

As described above, according to the present embodiment, by displaying information relating to a plurality of received jobs, and allowing change of the execution order of jobs and cancel of execution of a job, it is possible to realise appropriate and efficient execution of jobs in accordance with a busy state of jobs.

Furthermore, by arranging the apparatus such that change of the execution order of jobs and cancel of execution of a job can also be realized through the operation unit of the apparatus, it is possible to perform convenient and effective job control.

The present invention may be applied to a system comprising a plurality of apparatuses, or to an apparatus comprising a single unit, the present invention may, of course, be applied to a case in which the object of the invention is achieved by supplying a system or an apparatus with programs.

As described above, by providing a configuration of displaying jobs before and after changing the form of execution of jobs, job control and job processing effective for a plurality of jobs can be performed.

Furthermore, it becomes unnecessary to perform troublesome job processing, and setting can be easily performed.

By providing setting such that a plurality of jobs can be combined and processed at a time, complicated bookbinding processing can be set.

The individual components shown in outline or designated by blocks in the drawings are all well known in the image forming system arts and their specific construction and operation are not critical to the operation or the best mode for carrying out the invention.

While the present invention has been described with respect to what is presently considered to be preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing apparatus comprising:

an interface unit connected to a computer network;

a job receiver unit adapted to receive a remote job that is issued from a job issuing apparatus through the computer network;

a job issuance unit adapted to issue a local job at the data processing apparatus;

a processor unit adapted to perform the remote job or the local job; and a transmitter adapted to transmit data relating to the local job to a remote job issuing apparatus through the computer network, wherein the data relating to the local job includes first data indicating start of the local job and/or second data indicating end of the local job.

2. A data processing apparatus according to claim 1, wherein the remote job includes a print job based on print data.

3. A data processing apparatus according to claim 2, wherein the print data is described in a page description language.

4. A data processing apparatus according to claim 1, wherein a copy job and/or an output job of image data received via facsimile is performed as the local job.

5. A job issuing apparatus comprising:

a transmitter adapted to issue a first type of job to a data processing apparatus, the data processing apparatus issuing a second type of job as a local job;

a memory for storing data relating to the first type of job issued by said transmitter;

a receiver adapted to receive data relating to the second type of job from the data processing apparatus; and a controller adapted to control a display device to display the data relating to the second type of job, wherein the data relating to the second type of job includes first data indicating start of the second type of job and/or second data indicating end of the second type of job.

6. A job issuing apparatus according to claim 5, wherein said controller controls the display device to display the stored data relating to the first type of job and the received data relating to the second type of job by a common format.

7. A job issuing apparatus according to claim 5, further comprising a prediction unit adapted to predict a job performing time, wherein said controller controls the display device to display the predicted job performing time.

8. A job issuing apparatus according to claim 7, further comprising an order controller adapted to change an issuance order of a plurality of the first type of jobs to be issued and/or deleting a selected one of the plurality of the first type of jobs to be issued.

9. A job issuing apparatus according to claim 8, wherein, after said prediction unit predicts respective job performing times for a plurality of the first type of jobs to be issued and an instruction for changing the issuance order of the plurality of the first type of jobs and/or deleting the selected one of the plurality of the first type of jobs is received, said prediction unit renews the respective job performing times of the plurality of the first type of jobs.

10. A job issuing apparatus according to claim 7, wherein, after said prediction unit predicts respective job performing times for a plurality of the first type of jobs to be issued and the second type of job becomes pending in the data processing apparatus, said prediction unit renews the respective job performing times of the plurality of the first type of jobs.

11. A job issuing apparatus according to claim 7, wherein, after said prediction unit predicts respective job performing times for a plurality of the first type of jobs to be issued and one of the plurality of the first type of jobs is completed, said prediction unit renews the respective job performing times of the rest of a remainder of the plurality of the first type of jobs.

12. A job issuing apparatus according to claim 5, wherein the first type of job includes a print job based on print data.

13. A job issuing apparatus according to claim 12, wherein the print data is described in a page description language.

14. A job issuing apparatus according to claim 5, wherein the data processing apparatus includes a function for performing a copy job and/or an output job of image data received via facsimile as the second type of job.

15. A job issuing method, comprising the steps of:
   a transmitter issuing a first type of job to a data processing apparatus, the data processing apparatus issuing a second type of job as a local job;
   storing, in a memory, data relating to the first type of job issued by the transmitter;
   a receiver receiving data relating to the second type of job from the data processing apparatus; and
   controlling a display device to display the data relating to the second type of job;
   wherein the data relating to the second type of job includes first data indicating start of the second type of job and/or second data indicating end of the second type of job.

16. A method according to claim 15, wherein said controlling step includes controlling the display device to display the stored data relating to the first type of job and the received data relating to the second type of job by a common format.

17. A method according to claim 15, further comprising the step of predicting a job performing time, and wherein said controlling step includes controlling the display device to display the predicted job performing time.

18. A method according to claim 17, further comprising the step of changing an issuance order of a plurality of the first type of jobs to be issued and/or deleting a selected one of the plurality of the first type of jobs to be issued.

19. A method according to claim 18, further comprising the step of, after prediction in said predicting step of respective job performing times for a plurality of the first type of jobs to be issued and after receipt of an instruction for changing the issuance order of the plurality of the first type of jobs and/or deleting the selected one of the plurality of the first type of jobs, renewing the respective job performing times of the plurality of the first type of jobs.

20. A method according to claim 17, further comprising the step of, after prediction in said predicting step of respective job performing times for a plurality of the first type of jobs to be issued and the second type of job becomes pending in the data processing apparatus, renewing the respective job performing times of the plurality of the first type of jobs.

21. A method according to claim 17, further comprising the step of, after prediction in said predicting step of respective job performing times for a plurality of the first type of jobs to be issued and completion of one of the plurality of the first type of jobs, renewing the respective job performing times of the rest of a remainder of the plurality of the first type of jobs.

22. A method according to claim 15, wherein the first type of job includes a print job based on print data.

23. A method according to claim 22, wherein the print data is described in a page description language.

24. A method according to claim 15, wherein the data processing apparatus includes a function for performing a copy job and/or an output job of image data received via facsimile as the second type of job.

25. A computer-readable memory medium storing executable code for a job issuing method, the method comprising the steps of:
   a transmitter issuing a first type of job to a data processing apparatus, the data processing apparatus issuing a second type of job as a local job;
   storing, in a memory, data relating to the first type of job issued by the transmitter;
   a receiver receiving data relating to the second type of job from the data processing apparatus; and
   controlling a display device to display the data relating to the second type of job,
   wherein the data relating to the second type of job includes first data indicating start of the second type of job and/or second data indicating end of the second type of job.

26. A memory medium according to claim 25, wherein said controlling step includes controlling the display device to display the stored data relating to the first type of job and the received data relating to the second type of job by a common format.

27. A memory medium according to claim 25, wherein said method further comprises the step of predicting a job performing time, and wherein said controlling step includes controlling the display device to display the predicted job performing time.

28. A memory medium according to claim 27, wherein said method further comprises the step of changing an issuance order of a plurality of the first type of jobs to be issued and/or deleting a selected one of the plurality of the first type of jobs to be issued.

29. A memory medium according to claim 28, wherein said method further comprises the step of, after prediction in said predicting step of respective job performing times for a plurality of the first type of jobs to be issued and after receipt of an instruction for changing the issuance order of the plurality of the first type of jobs and/or deleting the selected one of the plurality of the first type of jobs, renewing the respective job performing times of the plurality of the first type of jobs.

30. A memory medium according to claim 27, wherein said method further comprises the step of, after prediction in said predicting step of respective job performing times for a plurality of the first type of jobs to be issued and the second type of job becomes pending in the data processing apparatus, renewing the respective job performing times of the plurality of the first type of jobs.

31. A memory medium according to claim 27, wherein said method further comprises the step of, after prediction in said predicting step of respective job performing times for a plurality of the first type of jobs to be issued and completion of one of the plurality of the first type of jobs, renewing the respective job performing times of the rest of a remainder of the plurality of the first type of jobs.

32. A memory medium according to claim 25, wherein the first type of job includes a print job based on print data.

33. A memory medium according to claim 32, wherein the print data is described in a page description language.

34. A memory medium according to claim 25, wherein the data processing apparatus includes a function for performing a copy job and/or an output job of image data received via facsimile as the second type of job.

35. A program product embodying executable code for a job issuing method, the method comprising the steps of:
- a transmitter issuing a first type of job to a data processing apparatus, the data processing apparatus issuing a second type of job as a local job;
- storing, in a memory, data relating to the first type of job issued by the transmitter;
- a receiver receiving data relating to the second type of job from the data processing apparatus; and
- controlling a display device to display the data relating to the second type of job,
- wherein the data relating to the second type of job includes first data indicating start of the second type of job and/or second data indicating end of the second type of job.

36. A program product according to claim 35, wherein said controlling step includes controlling the display device to display the stored data relating to the first type of job and the received data relating to the second type of job by a common format.

37. A program product according to claim 35, wherein said method further comprises the step of predicting a job performing time, and wherein said controlling step includes controlling the display device to display the predicted job performing time.

38. A program product according to claim 37, wherein said method further comprises the step of changing an issuance order of a plurality of the first type of jobs to be issued and/or deleting a selected one of the plurality of the first type of jobs to be issued.

39. A program product according to claim 38, wherein said method further comprises the step of, after prediction in said predicting step of respective job performing times for a plurality of the first type of jobs to be issued and after receipt of an instruction for changing the issuance order of the plurality of the first type of jobs and/or deleting the selected one of the plurality of the first type of jobs, renewing the respective job performing times of the plurality of the first type of jobs.

40. A program product according to claim 37, wherein said method further comprises the step of, after prediction in said predicting step of respective job performing times for a plurality of the first type of jobs to be issued and the second type of job becomes pending in the data processing apparatus, renewing the respective job performing times of the plurality of the first type of jobs.

41. A program product according to claim 37, wherein said method further comprises the step of, after prediction in said predicting step of respective job performing times for a plurality of the first type of jobs to be issued and completion of one of the plurality of the first type of jobs, renewing the respective job performing times of the rest of a remainder of the plurality of the first type of jobs.

42. A program product according to claim 35, wherein the first type of job includes a print job based on print data.

43. A program product according to claim 42, wherein the print data is described in a page description language.

44. A program product according to claim 35, wherein the data processing apparatus includes a function for performing a copy job and/or an output job of image data received via facsimile as the second type of job.

* * * * *

UNITED STATES PATENT AND TRADEMARK OFFICE
CERTIFICATE OF CORRECTION

PATENT NO. : 6,466,327 B2
DATED : October 15, 2002
INVENTOR(S) : Keishi Inaba et al.

It is certified that error appears in the above-identified patent and that said Letters Patent is hereby corrected as shown below:

Column 3,
Line 37, "sector 220" should read -- sorter 220 --.
Line 56, "tough" should read -- touch --.
Line 63, "filling" should read -- filing --.

Column 4,
Line 44, "(step S603)." should read -- (step S503). --.

Column 5,
Line 4, "(step S504)," should read -- (step S604), --.
Line 31, "device 5" should read -- device 6 --.

Column 6,
Line 37, "I/F (interface) 1306" should read -- I/F (interface) 1305 --.
Line 57, "U.S. Pat. No. 5,327,626" should read -- U.S. Pat. No. 5,327,526 --.

Column 7,
Line 12, "computer 16a." should read -- computer 15a. --.
Line 19, "time T(l)" should read -- time T(i) --.
Line 20, "1" should read -- i --.
Line 63, "either" should read -- other --.
Line 64, "then" should read -- than --.

Column 8,
Line 14, "the" should read -- one --.

Column 9,
Line 27, "realise" should read -- realize --.

Signed and Sealed this

Thirteenth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,466,327 B2
DATED          : October 15, 2002
INVENTOR(S)    : Keishi Inaba et al.

It is certified that error appears in the above-identified patent and that said Letters Patent is hereby corrected as shown below:

<u>Title page,</u>
Item [56], References Cited, U.S. PATENT DOCUMENTS, insert: -- 5,940,582 8/1995 Hower, Jr. et al...... 358/1.15 --.
"Hisatane et al." should read -- Hisatake et al. --.

Signed and Sealed this

Twelfth Day of August, 2003

JAMES E. ROGAN
*Director of the United States Patent and Trademark Office*